United States Patent
Pinder

(10) Patent No.: US 8,837,726 B2
(45) Date of Patent: Sep. 16, 2014

(54) CONTENT PROTECTION KEY ENCRYPTOR FOR SECURITY PROVIDERS

(75) Inventor: Howard G. Pinder, Norcross, GA (US)

(73) Assignee: Cisco Technology, Inc., San Jose, CA (US)

( * ) Notice: Subject to any disclaimer, the term of this patent is extended or adjusted under 35 U.S.C. 154(b) by 304 days.

(21) Appl. No.: 12/580,589

(22) Filed: Oct. 16, 2009

(65) Prior Publication Data

US 2011/0091037 A1    Apr. 21, 2011

(51) Int. Cl.
  H04L 29/06    (2006.01)
  H04L 9/08    (2006.01)

(52) U.S. Cl.
  CPC .......... H04L 9/0822 (2013.01); H04L 9/0897 (2013.01); *H04L 9/083* (2013.01)
  USPC .......... 380/255; 713/150; 713/153; 713/155; 713/166

(58) Field of Classification Search
  CPC .. H04L 9/0822; H04L 9/0897; H04L 2209/60
  USPC ....................................... 380/255
  See application file for complete search history.

(56) References Cited

U.S. PATENT DOCUMENTS

| | | | | |
|---|---|---|---|---|
| 5,237,610 A | * | 8/1993 | Gammie et al. | 380/228 |
| 5,870,474 A | * | 2/1999 | Wasilewski et al. | 380/211 |
| 5,999,629 A | * | 12/1999 | Heer et al. | 705/51 |
| 6,393,128 B1 | * | 5/2002 | Rix et al. | 380/283 |
| 2004/0001594 A1 | * | 1/2004 | Krishnaswamy et al. | 380/277 |
| 2004/0080672 A1 | * | 4/2004 | Kessler et al. | 348/553 |
| 2004/0111613 A1 | * | 6/2004 | Shen-Orr et al. | 713/165 |
| 2005/0027871 A1 | * | 2/2005 | Bradley et al. | 709/227 |
| 2005/0078825 A1 | * | 4/2005 | Ohmori et al. | 380/255 |
| 2005/0144468 A1 | * | 6/2005 | Northcutt et al. | 713/189 |
| 2005/0182931 A1 | * | 8/2005 | Robert et al. | 713/168 |
| 2005/0278787 A1 | * | 12/2005 | Naslund et al. | 726/26 |
| 2006/0179489 A1 | * | 8/2006 | Mas Ribes | 726/27 |

OTHER PUBLICATIONS

Fujiyoshi et al., Hierarchical Encryption of Multimedia Contents for Access Control, Oct. 2006, IEEE International Conference on Image Processing, pp. 1977-1980.*

* cited by examiner

*Primary Examiner* — Mohammad L Rahman
*Assistant Examiner* — Kenneth Chang
(74) *Attorney, Agent, or Firm* — Edell, Shapiro & Finnan, LLC

(57) ABSTRACT

Techniques are provided to receive at an encryption device from a control device an encryption request comprising a message and an identifier for a device. The control device and the device are associated with a security provider that provides secure content to the device using the message encrypted with a device key that is securely embedded in the device and also stored on the encryption device. The encryption device is associated with a key provider and the device key is not divulged to the security provider. At the encryption device, the device key is retrieved based on the identifier. The message is encrypted with the device key using a predetermined algorithm, and the encrypted message is then sent to the control device.

20 Claims, 3 Drawing Sheets

CONTENT PROTECTION KEY ENCRYPTOR FOR SECURITY PROVIDERS

TECHNICAL FIELD

The present disclosure relates generally to encryption keys and particularly to techniques for encrypting content using a content protection key using device keys provided by another party.

BACKGROUND

Multiservice/system operators (MSOs), such as cable system operators, that provide telephony, television, and Internet services will generally build out a metropolitan area, or portion thereof, using a majority of a single vendor's equipment for providing secure services to customers. For example, a cable operator with operations in Orlando and Tampa may use manufacturer or vendor A's equipment in Orlando, and vendor B's equipment in Tampa. Supplier diversity and interoperability issues have generally driven this model. Having more than one supplier for equipment reduces overall risk for the cable operator. However, equipment from the various vendors is usually not interchangeable, e.g., vendor A's set-top box in a subscriber's home will usually not be able to interoperate with or decrypt services from vendor B's equipment in a headend facility.

In addition, cable system operators are facing ever increasing demands for bandwidth. Consumers are demanding faster Internet and more high definition (HD) television programs. In order to handle the increased bandwidth demands, cable system operators have been removing traditional analog programming and adding digital programming, which is less bandwidth intensive. Cable system operators are ready to transition to an "all digital" system. In order to go all digital, cable system operators must provide a means for the consumer to tune to these digital channels since many existing televisions are only analog cable ready and thus do not require a set-top box. One industry solution has been the universal Digital Transport Adapter (DTA) that can be manufactured by a variety of vendors. DTAs are relatively inexpensive and are a means for cable operators to smooth the transition for consumers to an all digital system. DTAs are receive-only devices, disposed inline on a cable feed to a customer's television, that employ a content protection scheme that is simpler than the high levels of encryption used in modern cable systems. Cable operators would prefer to employ DTAs from various vendors that can all operate securely within any given service area.

DETAILED DESCRIPTION

Overview

Techniques are provided herein to receive at an encryption device from a control device an encryption request comprising a message and an identifier for a device. The control device and the device are associated with a security provider (SP) that provides secure content to the device using the message encrypted with a device key that is securely embedded in the device and also stored on the encryption device. The encryption device is associated with a keying provider (KP) and the device key is not divulged to the SP. At the encryption device, the device key is retrieved based on the identifier. The message is encrypted with the device key using a predetermined algorithm, and the encrypted message is then sent to the control device. The control device can embed the encrypted message in an entitlement message, e.g., in entitlement control messages (ECMs) or in entitlement management messages (EMMs), for use by the device to decrypt services.

The control device is a typical headend control system and the device is a DTA. Traditionally, both would be made or specified by one supplier, i.e., the SP would also be the KP. A secret device key and identifier for the DTA are burned at the factory into a one-time programmable (OTP) memory in the DTA circuitry, e.g., in an application specific integrated circuit (ASIC) system on a chip (SoC). The device keys are provided by a KP and are usually stored in a secure "black box" at the factory. The OTP memory is tamper resistant to prevent theft of the device key from the DTA. The device keys may also be provided to and securely stored in the control system in the headend facility that services the associated DTA within the service area, once the DTA is in the field. SPs use the device keys to provide secure (encrypted) services from equipment in the headend to the DTA.

For a variety of reasons, including liability for compromised device keys, the device keys are known only to the KP and are not divulged to other parties. However, in any given business environment there may be multiple KPs and multiple SPs, and possibly multiple parties which are both KPs and SPs. A problem arises of how to transfer or make available device keys from a KP to an SP, even if the KP and SP have limited trust of one another. The techniques described herein provide a means to avoid the complexity of actually sharing device keys between vendors using the encryption device described above. The encryption device is made up of secure or trusted computing base (TCB) components that are highly resistant to tampering. The TCB components prevent theft of the devices keys. In this manner, the SPs, e.g., cable system equipment providers, can use encryption devices provided by a plurality of KPs within the headend facility to provide secure services to DTAs manufactured with keys provided by the KPs without divulging the device keys to another party, e.g., the SP.

Example Embodiments

Figure 1:
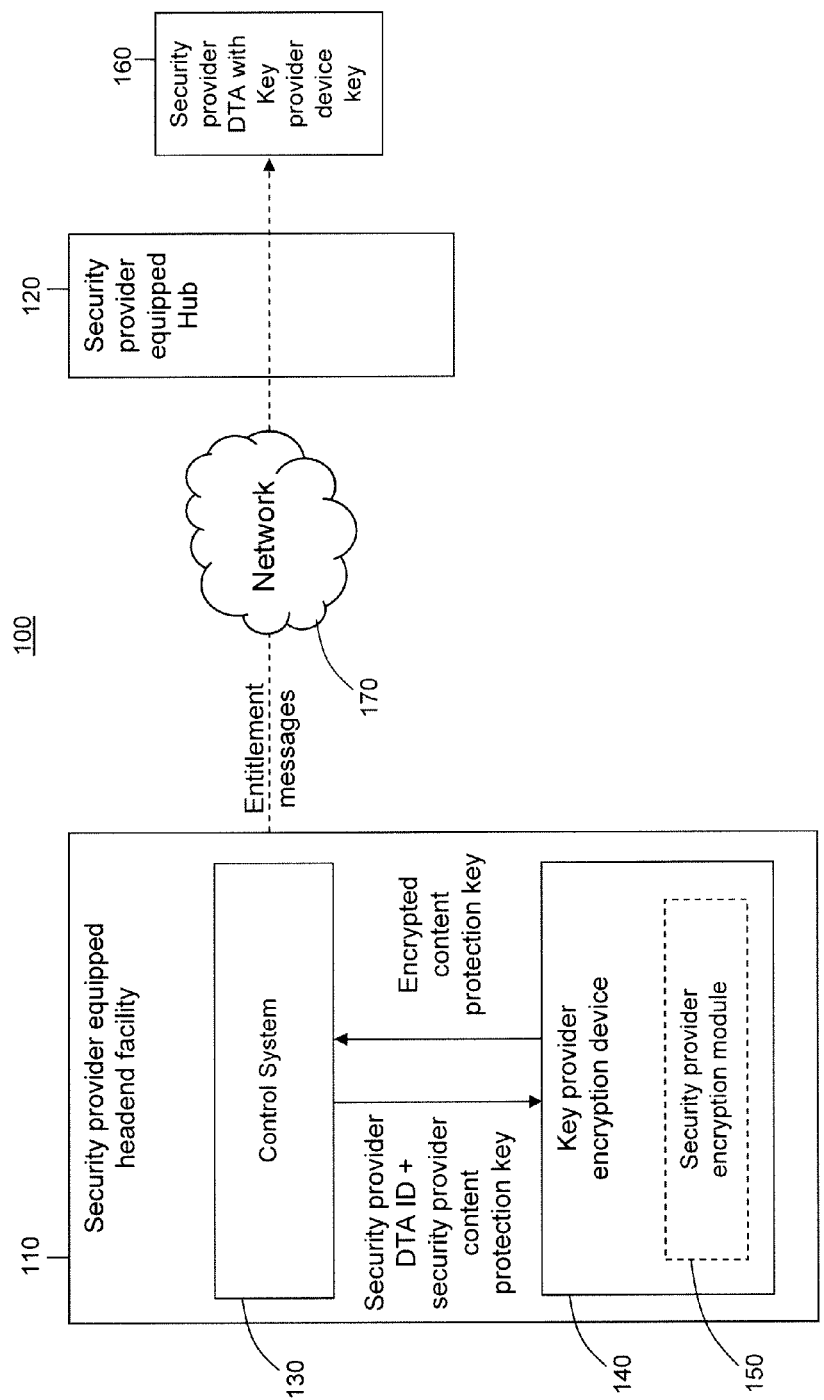
FIG. 1 illustrates an example block diagram of a system configured to use content protection keys encrypted using an encryption device supplied by another party.

Referring first to FIG. 1, a system 100 that is operated using equipment provided by an SP is shown. The system 100 is configured to use messages, e.g., content protection keys (CPKs), encrypted using an encryption device supplied by a KP. The system 100 includes a headend facility (HEF) 110, a network 170, a hub 120, and DTA 160 that usually resides in a customer premise. The system 100 may contain other hubs, networking components, splitters, coaxial and fiber optic cables, cable modems, and the like, which are not shown for simplicity.

The HEF 110 comprises a control system 130 and a KP encryption device 140. The HEF 110 contains a majority of vendor specific components manufactured or specified by an SP. The HEF 110 is connected to various content providers, and may contain a video on demand (VOD) server for providing media content (e.g., movies, television channels, etc.). The media content is distributed by HEF 110 to the hub 120 via network 170 (e.g., a synchronous optical network (SONET), synchronous digital hierarchy (SDH) network, or Internet protocol (IP) network). The content is further distributed by hub 120 to DTA 160 in the form of digital video.

The system 100 may contain hundreds of DTAs or set-top boxes associated with various subscribers or customers.

The HEF 110 may also contain other components that provide services for delivering content to the various subscribers, such as signal conditioning, content aggregation, transport stream conversion, various forms of network encapsulation, encoding, encryption, etc. The control system 130 is a typical cable industry control system for a HEF that provisions various system components and controls access to media, and other content or services provided by the MSO. The control system 130 may direct the activities in the HEF 110, e.g., the control system 130 may direct which services or content intended for the various subscribers are encrypted in system 100, and give permissions to the subscriber devices to decrypt the services and content. It is to be appreciated that the functions described with respect to the control system 130 may be distributed among various components, devices, or software or hardware modules in the HEF 110.

In general, media content provided by the HEF 110 to the DTA 160 is encrypted with a control word (CW) or control key. The CW is itself encrypted with a CPK. The CPK is encrypted with the device key. The encrypted CW and encrypted CPK are provided to a DTA. The DTA decrypts the encrypted CPK using its device key. The DTA uses the CPK to decrypt the CW. The CW is then used to decrypt the media content. It should be understood that this method of decryption is one example of how keys are used within system 100 and that other combinations of keys or encryption methods may be used, e.g., a DTA may have more that one device key.

The KP encryption device 140 is provided and maintained by the KP, and is configured to receive a request or message containing an SP provided CPK and a DTA ID from control system 130, e.g., a DTA ID for DTA 160. The KP encryption device 140 encrypts the CPK with the device key corresponding to the DTA ID using a predetermined algorithm and returns the encrypted CPK to the control system 130. While embodiments are described herein with respect to encrypting CPKs, any data, messages, or keys may be encrypted using the encryption device 140 in environments where device or secret keys are not divulged by the KP.

The predetermined algorithm for encrypting the CPK must be agreed upon by the SP and KP ahead of time so that the corresponding DTA can decrypt the encrypted CPK. For example, the SP and KP could agree upon using the Data Encryption Standard (DES) or triple DES (3DES). In another example the message sent from the control system 130 to the KP encryption device 140 may contain an encryption algorithm selector that indicates the algorithm to use when encrypting the CPK. If the SP does not want to divulge the algorithm, e.g., a proprietary algorithm, then the SP can provide an optional SP encryption module 150. The SP encryption module 150 may be a pluggable component such as a Universal Serial Bus (USB) or Peripheral Component Interconnect (PCI) form factor with a TCB architecture. The KP encryption device 140 is designed to receive the SP encryption module 150. The KP encryption device 140 sends the CPK and the device key to the SP encryption module 150 for encryption. The SP encryption module 150 returns the encrypted CPK to the KP encryption device 140, which in turn, sends the encrypted CPK to the control system 130.

Figure 2:
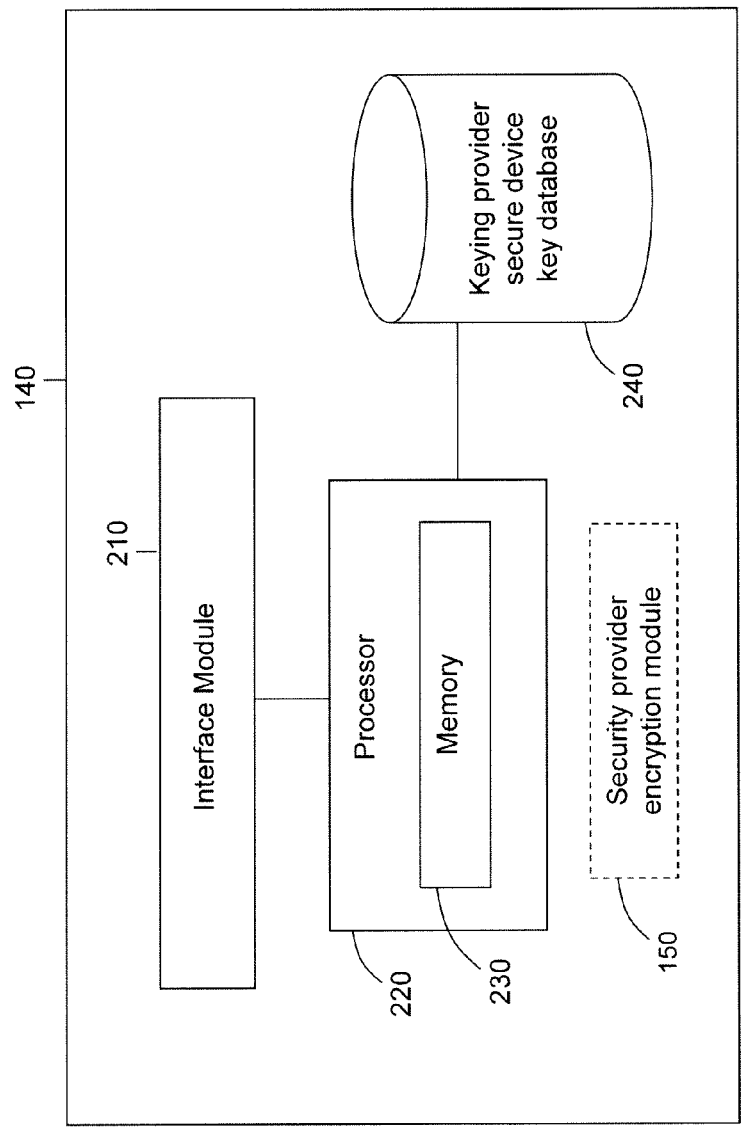
FIG. 2 illustrates an example block diagram of the encryption device that is configured to encrypt content protection keys using device keys.

Turning now to FIG. 2, an example block diagram is depicted of a KP encryption device, e.g., KP encryption device 140 that is configured to encrypt CPKs with a device key. The KP encryption device 140 comprises an interface unit 210, a controller or data processing device 220, a memory 230, and a KP secure device key database 240. Resident in the memory 230 is software configured to encrypt CPKs with device keys retrieved from the KP secure device key database 240. The KP secure device key database 240 may be stored in secure memory, on a secure hard drive, or using other secure storage means. The encryption functions of the KP encryption device 140 may be implemented and executed on available commercial off-the-shelf computing equipment. The KP encryption device 140 may also include an optional SP encryption module 150 as described above.

The data processing device 220 may be a secure microprocessor, microcontroller, systems on a chip (SOCs), or other fixed or programmable logic that secures the appropriate information. The memory 230 may be any form of secure random access memory (RAM) or other data storage block that stores data used for the techniques described herein. The memory 230 may be separate or part of the processor 220. Instructions for encrypting CPKs may be stored in the memory 230 for execution by the processor 220. The interface unit 210 enables communication between the KP encryption device 140 and the control system 130.

The functions of the processor 220 may be implemented by a processor readable tangible medium encoded with instructions or by logic encoded in one or more tangible media (e.g., embedded logic such as an application specific integrated circuit (ASIC), digital signal processor (DSP) instructions, software that is executed by a processor, etc.), wherein the memory 230 stores data used for the computations or functions described herein (and/or to store software or processor instructions that are executed to carry out the computations or functions described herein). Thus, functions of the KP encryption device 140 may be implemented with fixed logic or programmable logic (e.g., software or computer instructions executed by a processor or field programmable gate array (FPGA)).

Figure 3:
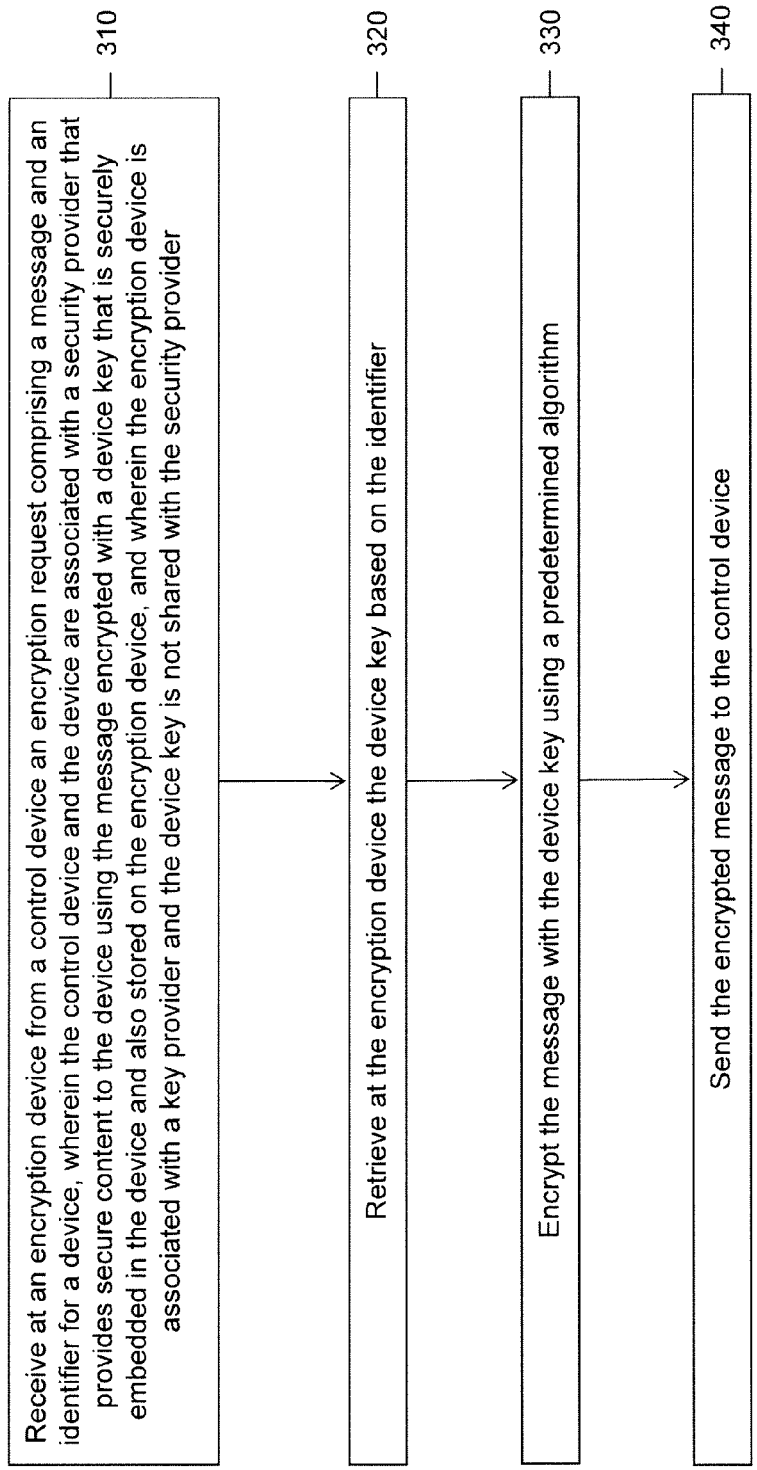
FIG. 3 illustrates an example flow chart generally depicting a process for encrypting content protection keys using device keys controlled by another party.

Referring to FIG. 3, with continued reference to FIG. 1, a process for encrypting CPKs encrypted using device keys controlled by a KP is now described. At 310, a message comprising a CPK and an identifier for a device is received at an encryption device from a control device or system. The control device is associated with an SP that provides secure content to the device using the CPK encrypted with a device key that is securely embedded in the device and also stored on the encryption device. The encryption device is associated with a KP and the device key is not divulged to the SP.

In the process of establishing a cryptographic key many applications use a custom predetermined transformation. A custom transformation is a non-standard or non-obvious method or algorithm that modifies the data during key generation to increase the strength of the key against attack. In addition, a custom transformation allows a service provider to confront an attacker with one more barrier to overcome in order to defeat the system. In one example, a custom transformation may be applied to the CPK prior to sending the CPK to the encryption device 140. On the decryption end, the DTA 160 would perform a reverse or inverse transformation to obtain the original CPK.

At 320, the device key is retrieved at the encryption device based on the device identifier. The device keys for all of the DTAs that contain keys for a given KP, and serviced by the HEF 110, are securely stored in the encryption device as described above. The encryption device has a secure memory or secure hard drive for storing the device keys. At 330, The CPK is encrypted with the device key using a predetermined algorithm, and at 340, the encrypted CPK is sent to the control device. The control device can embed the encrypted CPK in an entitlement message, i.e., in ECMs or in EMMs, for use by the device to decrypt services. ECMs may target a broad group of subscribers, while EMMs are more DTA or set-top box specific.

The techniques described herein provide a simple means for multiple vendors to operate in a single environment by allowing KPs to retain control of device keys, while SPs can maintain control of proprietary encryption algorithms, or at least not disclose the encryption algorithms in use. A KP encryption device securely stores the devices keys and encrypts keys, messages, or other data for the SP. The SP, in turn, may provide an encryption module that provides the desired encryption algorithm.

Although the subject matter illustrated and described herein as embodied in one or more specific examples, it is nevertheless not intended to be limited to the details shown and described herein, since various modifications and structural changes may be made without departing from the scope and range of equivalents of the claims.

What is claimed is:

1. A method comprising:
   receiving at an encryption device from a control device an encryption request comprising a content protection key (CPK) to be encrypted and an identifier for a decryption device, wherein the control device is controlled by a security provider that provides secure content to the decryption device using the CPK encrypted with a device key that is securely embedded in the decryption device and also stored on the encryption device, wherein the encryption device is provided by a key provider and the device key is not divulged to the security provider in order to prevent a compromise of the device key, and wherein the secure content is secured by encrypting content using a control word that itself is encrypted by the CPK;
   retrieving at the encryption device the device key based on the decryption device identifier;
   encrypting the CPK with the device key using a predetermined algorithm; and
   sending the encrypted CPK to the control device.

2. The method of claim 1, wherein the predetermined algorithm is supplied by the security provider.

3. The method of claim 1, wherein encrypting comprises encrypting the CPK with the device key using a secure hardware module within the encryption device provided by the security provider, and wherein the predetermined algorithm is embedded in the secure hardware module.

4. The method of claim 1, wherein the predetermined algorithm comprises a plurality of encryption algorithms agreed upon by the security provider and the key provider, and further comprising selecting one of the plurality of encryption algorithms to encrypt the CPK.

5. The method of claim 1, wherein the device key is programmed into a secure one-time programmable memory of the decryption device during manufacture.

6. The method of claim 1, further comprising applying a predetermined transformation to the CPK prior to encrypting the CPK.

7. The method of claim 1, further comprising:
   encrypting a control word with the CPK; and
   encrypting a service intended for the decryption device with the control word.

8. The method of claim 1, wherein the CPK is used to encrypt services in a cable system and further comprising:
   encrypting a control word with the CPK at a headend facility; and
   encrypting a service intended for the decryption device with the control word, wherein the decryption device is a digital transport adapter.

9. An apparatus comprising:
   a storage device configured to securely store device identifiers and corresponding device keys;
   an interface configured to communicate with a control device that is controlled by a security provider that provides secure content to a decryption device using a content protection key (CPK) encrypted with a device key that is securely embedded in the decryption device and stored on the storage device;
   a processor configured to:
     receive an encryption request from the control device comprising the CPK to be encrypted and an identifier for the decryption device, wherein the apparatus is provided by a key provider and the device key is not divulged to the security provider in order to prevent a compromise of the device key, and wherein the secure content is secured by encrypting content using a control word that itself is encrypted by the CPK;
     retrieve the device key from the storage device corresponding to the identifier;
     encrypt the CPK with the device key using a predetermined algorithm; and
     send the encrypted CPK to the control device.

10. The apparatus of claim 9, wherein the processor is configured to encrypt the CPK using the predetermined algorithm that is supplied by the security provider.

11. The apparatus of claim 9, wherein the processor is configured to encrypt the CPK using a secure hardware module provided by the security provider, and wherein the predetermined algorithm is embedded in the secure hardware module.

12. The apparatus of claim 9, wherein the processor is configured to encrypt the CPK using a plurality of predetermined encryption algorithms agreed upon by the security provider and the key provider, and wherein the processor is further configured to select one of the plurality of encryption algorithms to encrypt the CPK.

13. A system comprising the apparatus of claim 9, and further comprising the decryption device, wherein the device key is programmed into a secure one-time programmable memory of the decryption device during manufacture.

14. A system comprising the apparatus of claim 9, and further comprising the control device, wherein the control device is configured to apply a predetermined transformation to the CPK prior to encrypting the CPK.

15. A system comprising the apparatus of claim 9, and further comprising the control device, wherein the control device is configured to:
   encrypt a control word with the CPK; and
   direct that a service intended for the decryption device be encrypted with the control word.

16. A system comprising the apparatus of claim 9, and further comprising the control device residing in a cable system headend facility and the decryption device comprising a digital transport adapter (DTA), wherein the control device is configured to:
   encrypt a control word with the CPK; and
   direct that a service intended for the DTA be encrypted with the control word.

17. A non-transitory processor readable tangible medium encoded with instructions that, when executed by a processor, cause the processor to:
   receive at an encryption device from a control device an encryption request comprising a content protection key (CPK) to be encrypted and an identifier for a decryption device, wherein the control device is controlled by a security provider that provides secure content to the decryption device using the CPK encrypted with a device key that is securely embedded in the decryption device and also stored on the encryption device, wherein the encryption device is provided by a key provider, and the device key is not divulged to the security provider in order to prevent a compromise of the device key, and wherein the secure content is secured by encrypting content using a control word that itself is encrypted by the CPK;

retrieve at the encryption device the device key based on the decryption device identifier;

encrypt the CPK with the device key using a predetermined algorithm; and send the encrypted CPK to the control device.

18. The non-transitory processor readable tangible medium of claim 17, wherein the predetermined algorithm is supplied by the security provider.

19. The non-transitory processor readable tangible medium of claim 17, wherein the instructions that encrypt comprise instructions that cause the processor to encrypt using a secure hardware module within the encryption device provided by the security provider, and wherein the predetermined algorithm is embedded in the secure hardware module.

20. The non-transitory processor readable tangible medium of claim 17, wherein the predetermined algorithm comprises a plurality of encryption algorithms agreed upon by the security provider and the key provider, and further encoded with instructions that, when executed by a processor, cause the processor to select one of the plurality of encryption algorithms to encrypt the CPK.

* * * * *